United States Patent [19]

Sexton

[11] Patent Number: 5,640,254

[45] Date of Patent: Jun. 17, 1997

[54] METHOD FOR APPLYING FM SCREENING TO A DIGITAL IMAGE

[75] Inventor: Cynthia M. Sexton, Tampa, Fla.

[73] Assignee: Polygraphex Systems, Inc., Clearwater, Fla.

[21] Appl. No.: 384,428

[22] Filed: Feb. 6, 1995

[51] Int. Cl.[6] .............................. H04N 1/46; G06F 15/00
[52] U.S. Cl. ..................... 358/536; 358/534; 358/535; 395/109; 395/118
[58] Field of Search ........................ 358/500, 515, 358/518, 533, 534, 535, 536, 298, 456, 459; 395/109, 102, 103, 108, 111, 137, 139, 100, 101; H04N 1/46

[56] References Cited

U.S. PATENT DOCUMENTS

| | | | |
|---|---|---|---|
| 4,135,927 | 1/1979 | Draugelis | 96/1.2 |
| 4,336,994 | 6/1982 | Banton | 355/4 |
| 4,518,246 | 5/1985 | Spitzner et al. | 355/4 |
| 4,581,309 | 4/1986 | Yamada et al. | 430/44 |
| 4,878,063 | 10/1989 | Katerberg | 346/1.1 |
| 5,010,398 | 4/1991 | Nys et al. | 358/518 |
| 5,045,931 | 9/1991 | Sakamoto | 358/536 |
| 5,107,331 | 4/1992 | Collell et al. | 358/536 |
| 5,166,809 | 11/1992 | Surbrook | 358/456 |
| 5,323,245 | 6/1994 | Rylander | 358/536 |
| 5,394,252 | 2/1995 | Holladay et al. | 358/536 |
| 5,426,519 | 6/1995 | Banton | 358/536 |
| 5,429,047 | 7/1995 | Hutcheson | 358/298 |
| 5,521,711 | 5/1996 | Onodera | 358/518 |
| 5,541,743 | 7/1996 | Shiomi | 358/534 |
| 5,548,407 | 8/1996 | Kienlin | 358/298 |

Primary Examiner—Edward L. Coles, Sr.
Assistant Examiner—Madeleine AV Nguyen
Attorney, Agent, or Firm—Larson & Larson, P.A.; James E. Larson

[57] ABSTRACT

A method for applying FM screening, also known as stochastic screening, to a digital image in a computer. The method permitting manipulation and editing "on-screen" of a CMYK image having a random dot pattern (FM screening) applied. The method permitting the "on-screen" editing of each of the four color separations (cyan, magenta, yellow, and black) of the CMYK FM screened image while viewed as a single composite image. The "on-screen" editing of the CMYK image performed and viewed before the image is directed to an imaging device.

12 Claims, 4 Drawing Sheets

METHOD FOR APPLYING FM SCREENING TO A DIGITAL IMAGE

BACKGROUND OF THE INVENTION

1. Field of the Invention

This invention relates to a method for applying FM screening to a digital image. More particularly, it relates to a novel method for applying FM screening to a digital image, permitting editing of an FM screened digital image "on-screen", before the FM screened image is directed to an imaging device.

2. Description of Prior Art

FM screening (frequency modulated screening), also referred to as stochastic screening, is a process of randomly applying very small dots of the same size to a digital image. The relative size of the dots used in FM screening remains constant while their position changes; distances between the dots determine different color tones. FM screening processes of the prior art apply the FM screening at an imaging device which immediately thereafter prints the image through an output of the imaging device.

FM screening is different from a process known as AM screening (amplitude modulated screening) which utilizes perfectly geometric dots, such as round, square, diamond, elliptical, and other geometric dots, which change in size but remain in a constant position. AM screening employs conventional half-tones to acquire different shades of color. Conventional halftones, also known as middle tones, of any color are produced by varying the size of the dots being used, hence AM screening, changing the "amplitude" of the dot. The simplest example of conventional half-tones is seen in black and white offset printing, wherein conventional half-tones create the illusion of gray tones being present in a picture. By varying the size of the black dots to allow a larger area of the white paper to show through in a picture, gray tones are produced. FM screening does not utilize conventional half-tones to produce different color tones, but instead varies the position or "frequency" of the dot to produce different color tones, hence frequency modulation screening—FM screening.

FM screening can produce a printed image having superior characteristics over an original digital image and to printed images utilizing processes such as AM screening or other standard four-color printing processes. Examples of the superior characteristics include better definition and resolution, enhanced color and hue, smoother gradations of tones, and an ability to retain delicate qualities of an original image. Another advantage of FM screening includes the elimination of moiré patterns, an interference problem that occurs when printing four conventional half-tones on top of each other, wherein the dots of the four conventional half-tones do not fall at the precise right angles. Because FM screening places the dots randomly and does not use conventional half-tones to produce different color tones, no interference patterns are created.

Although FM screening can produce an image with superior characteristics over other standard printing processes, there are some inherent disadvantageous with the current FM screening processes. The known FM screening processes apply the FM screening to a digital image in a single file at the imaging device, utilizing a software program compatible with the imaging device. The software program is loaded into the RIP (Raster Imaging Process) of the imaging device. The software in the RIP seriously limits what can be done to an FM screened image. The prior art does not allow the FM screening to be applied to the individual color separations of the image. Further, editing an FM screened image "on-screen" can not be done in the prior art since the FM screening is applied immediately before printing. The end result of the FM screened image is determined after the image has been printed through the output of the imaging device; there is no way to provide a proof without printing. Consequently, many printed FM screened images are discarded because the desired results are not attained. The user is forced to return to the original digital image, having no FM screening applied, manipulate that image, and finally send the image to the imaging device, allowing the FM screening to be applied at the RIP, thereafter printing another FM screened image through the imaging device output. If the desired results are not satisfactory, the printed image is again discarded and the steps are performed until the desired result is produced. Therefore, manipulation of the digital image using the prior art FM screening processes is simply "trial and error." One can easily see the increase of costs due to materials being discarded as well as the operator time that is wasted attempting to render the desired printed FM screened image using known FM screening processes.

Another disadvantage of the FM screening prior art involves dot gain of FM screen dots. Dot gain is defined as the difference between the actual printed density of a color and the specified density. Because FM dots are smaller, dot gain is greater in FM screening processes. Essentially, smaller dots spread out more in relation to their size. The problem of dot gain in the prior art can be solved by compensating for the gain at the imaging device. This involves calibrating the imaging device for proper FM screening output, an extra cost most likely passed on to the consumer by the operator or owner of the imaging device.

Yet another inherent disadvantage of the prior art is in that the software loaded in the RIP determines the specific shape and density of the dot used in the FM screening process. The specific shape and density of the FM dots are determined by the manufacturer of the software program when it is written. The user of the software program has no ability to customize shape and density of the FM dots. Since the software loaded in the RIP is written to be compatible with a particular imaging device, the FM screening capabilities of individual imaging devices are seriously limited by the FM screening software.

There is a need for a novel method for applying FM screening to a digital image which will allow a user to manipulate the image after the FM screening has been applied, and before the image is printed by the imaging device. The novel method should allow the operator to perform editing of the FM screened image "on-screen." Further, the novel method should eliminate the need for the software program loaded in the RIP of the imaging device.

SUMMARY OF THE INVENTION

I have invented a new and original method for applying FM screening to a digital image which allows manipulation of the FM screened image before it is directed to an imaging device for printing. My method for applying FM screening produces a single FM screened composite CMYK image while retaining the color separations and composite image in the single composite image, within a computer. The image is available for manipulation "on-screen" before it is directed to an imaging device. Because my method possesses an "on-screen" editing ability of an FM screened image, the problems inherent with FM screening processes of the prior art, as described above, are eliminated.

My method utilizes a digital image, represented in a computer as a CMYK composite image. Utilizing any pixel or postscript based image editing software, my method first separates the composite image into four color separation channels. The four channels include: the cyan separation channel, the magenta separation channel, the yellow separation channel, and the black separation channel. The four separated color channels are then converted into respective grayscale images and can be saved in a storage medium as four distinct files. The grayscale images are conventional half-tone images, void of any color. They are referred to respectively as the cyan, magenta, yellow, and black grayscale images. The four grayscale images are then converted into respective FM screened bit-map images by applying a random dot pattern (FM screening). The FM screened bit-map images, which by definition are void of any conventional half-tones, can be saved in a storage medium as four respective and separate bit-map files. The FM screened bit-map images are then directed through respective color channels and combined to produce a single composite CMYK FM screened digital image, which can be saved in the storage medium. The composite CMYK FM screened image retains each color separation thereby enabling each FM screened color separation to be manipulated in the computer "on-screen" by the operator before it is directed to an imaging device.

Particular advantageous of my method for applying FM screening to a digital image include: "on-screen" editing of the FM dot structure; manipulation of all features regarding each color separation; compensating for the dot gain of the FM dots in the computer instead of at the imaging device, thereby eliminating the expensive and time consuming calibration of the imaging device; providing an accurate proof of the end result without actually printing the image, thereby eliminating unnecessary waste of valuable printing materials and the operator's time; and eliminating the need for the software program in the RIP of an imaging device, thereby allowing my FM screening process to be used with any imaging device capable of outputting an FM screened image. Other particular advantageous, and objects of my novel method for applying FM screening to a digital image will be described hereafter.

BRIEF DESCRIPTION OF THE DRAWINGS

The invention may be best understood by those having ordinary skill in the art by reference to the following detailed description when considered in conjunction with the accompanying drawings in which.

DETAILED DESCRIPTION OF THE INVENTION

Figure 1:
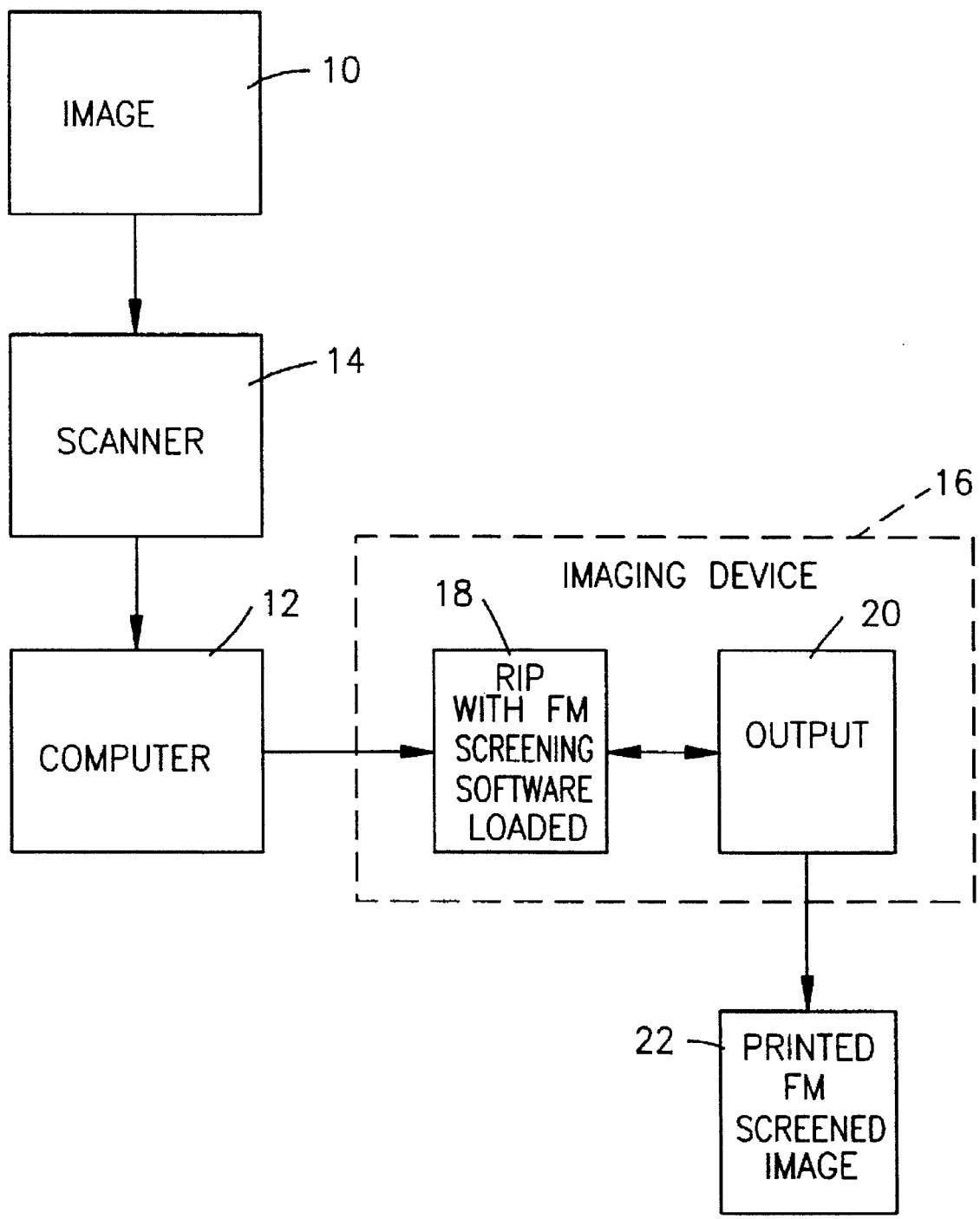
FIG. 1 is a block diagram illustrating how FM screening is applied to a digital image in the prior art.

Throughout the following detailed description, the same reference numerals refer to the same elements in all figures.

Referring to FIG. 1, a block diagram is shown to illustrate the known method for applying FM screening to a digital image. In the prior art, an image 10 is scanned into a computer 12 by a scanner 14. The scanned image in the computer, a digital representation of image 10, is directed to an imaging device 16. The imaging device 16 has a RIP 18 (Raster Imaging Process) containing a software program loaded within the RIP 18 capable of applying a random dot pattern, the FM screening, to the digital image with a pre-defined FM dot shape and density. After the FM screening has been applied, the FM screened image is directed through an output 20 of the imaging device 16 producing a printed FM screened image 22.

Figure 2:
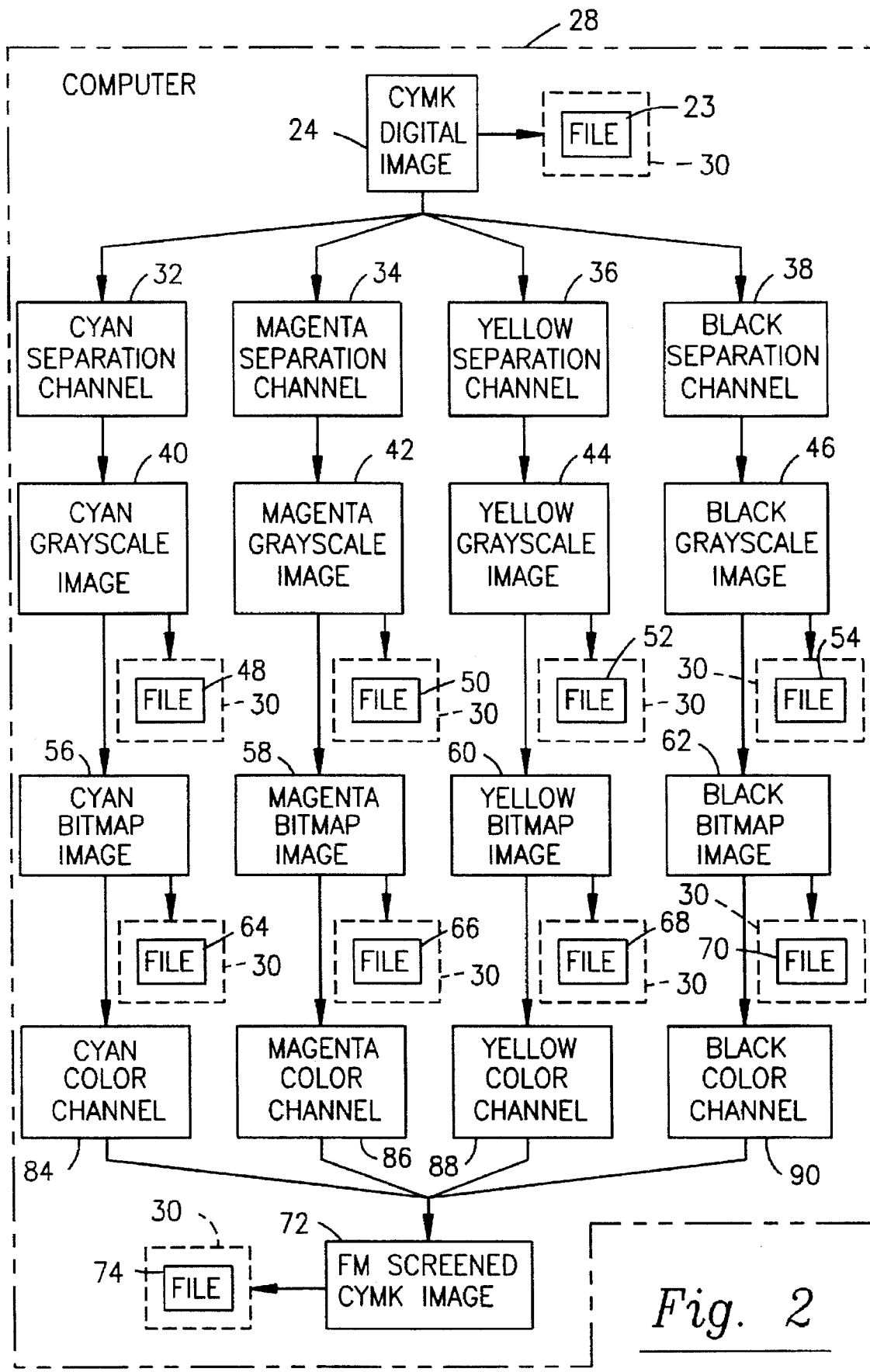
FIG. 2 is a block diagram illustrating the steps performed in a method for applying FM screening of the present invention.

The method of the present invention utilizes a digital image in a computer and any pixel or postscript based image editing software program. The image can be either scanned into a computer using known scanning means or be a digitally produced image. Referring to FIG. 2, the digital image provides a CMYK digital image 24 in random access memory of a computer 28. The CMYK digital image 24 is a four-color composite digital image, the letters CMYK representing C for cyan, M for magenta, Y for yellow, and K for black. The CMYK digital image 24 can be retained as a CMYK digital file 23 in a storage medium 30 for later retrieval and use.

Referring to FIG. 2, the CMYK digital image 24, present in random access memory, is separated into four separate color separation channels including, a cyan separation channel 32, a magenta separation channel 34, a yellow separation channel 36, and a black separation channel 38. The four color separation channels 32, 34, 36, and 38 are converted into four corresponding grayscale images, respectively, including, a cyan grayscale image 40, a magenta grayscale image 42, a yellow grayscale image 44 and a black grayscale image 46. The four grayscale images 40, 42, 44, and 46 are conventional half-tone images void of any color. The grayscale images are represented by black dots which vary in size but remain in a constant position. The four grayscale images 40, 42, 44, and 46 have different coverage values from one another but retain a relative coverage value with respect to the four corresponding color separation channels 32, 34, 36, and 38. Once the four grayscale images 40, 42, 44, and 46 have been fully rendered in random access memory, they can be retained in four corresponding grayscale files including, a cyan grayscale file 48, a magenta grayscale file 50, a yellow grayscale file 52, and a black grayscale file 54 in the storage medium 30.

Referring to FIG. 2, the four grayscale images 40, 42, 44, and 46, present in random access memory, are converted into four corresponding FM screened bit-map images, respectively, including, a cyan FM screened bit-map image 56, a magenta FM screened bit-map image 58, a yellow FM screened bit-map image 60, and a black FM screened bit-map image 62. The four grayscale images 40, 42, 44, and 46 are converted by applying a random dot pattern, FM screening, to the four grayscale images 40, 42, 44, and 46 images, to provide the four corresponding FM screened bit-map images, 56, 58, 60, and 62. The four FM screened bit-map images 56, 58, 60, and 62 are represented by black FM dots, void of any conventional half-tone dots. The coverage values of the four FM screened bit-map images 56, 58, 60, and 62 are different from one another but retain a relative coverage value with respect to the four color separation channels, 32, 34, 36, and 38. Once the four FM screened bit-map images 56, 58, 60, and 62 have been fully rendered in random access memory, they can be retained in four corresponding FM screened bit-map files, respectively, including, a cyan FM screened bit-map file 64, a magenta FM screened bit-map file 66, a yellow FM screened bit-map file 68, and a black FM screened bit-map file 70 in the storage medium.

Referring to FIG. 2, the four FM screened bit-map images 56, 58, 60, and 62, present in random access memory, are combined producing a single composite CMYK FM screened digital image 72 while retaining accessibility to the four separate FM screened bit-map images 56, 58, 60, and 62 within the single composite CMYK FM screened digital image 72. Color is supplied to the FM screened bit-map images 56, 58, 60, and 62 within the single composite CMYK FM screened digital image by applying a respective color channel immediately before the bit-map images are combined. The color channels include a cyan color channel 84, a magenta color channel 86, a yellow color channel 88, and a black color channel 90. The four color channels 84, 86, 88, and 90 in any of the pixel or postscript based image editing software programs that can be used with the present invention are representative of four color plates used in four-color ink printing processes.

Referring to FIG. 2, the CMYK FM screened image 72, present in random access memory, can be retained in a single composite CMYK FM screened digital file 74 in the storage medium 30. If file 74 is later retrieved into random access memory from the storage medium 30, the image still maintains the identical qualities of CMYK FM screened digital image 72.

The CMYK FM screened image 72 provides a means for pre-imaging image manipulation before the image 72 is directed to an imaging device. The method of the present invention allows the rendered CMYK FM screened image 72 to be edited "on-screen." The image 72 can be viewed on a monitor (not shown). An operator of the present method can control the position of the FM dots applied to the image 72. Further, since accessibility to the four FM screened bit-map images 56, 58, 60, and 62, colorizedbycolor channels 84, 86, 88, and 90, exists within image 72, any of the four colors, cyan, magenta, yellow, and black, can be manipulated by itself without affecting the other respective colors. The method of the present invention permits color correction, correct color registration, editing of the FM dot structures, and manipulation of all features regarding each separation of the image 72 "on-screen" and before the imaging process, while still in a digital and editable format. The present method eliminates the need for extra software or special equipment to translate or change the image into an FM screening type format for or during printing on the imaging device, as done in the prior art.

Figure 3:
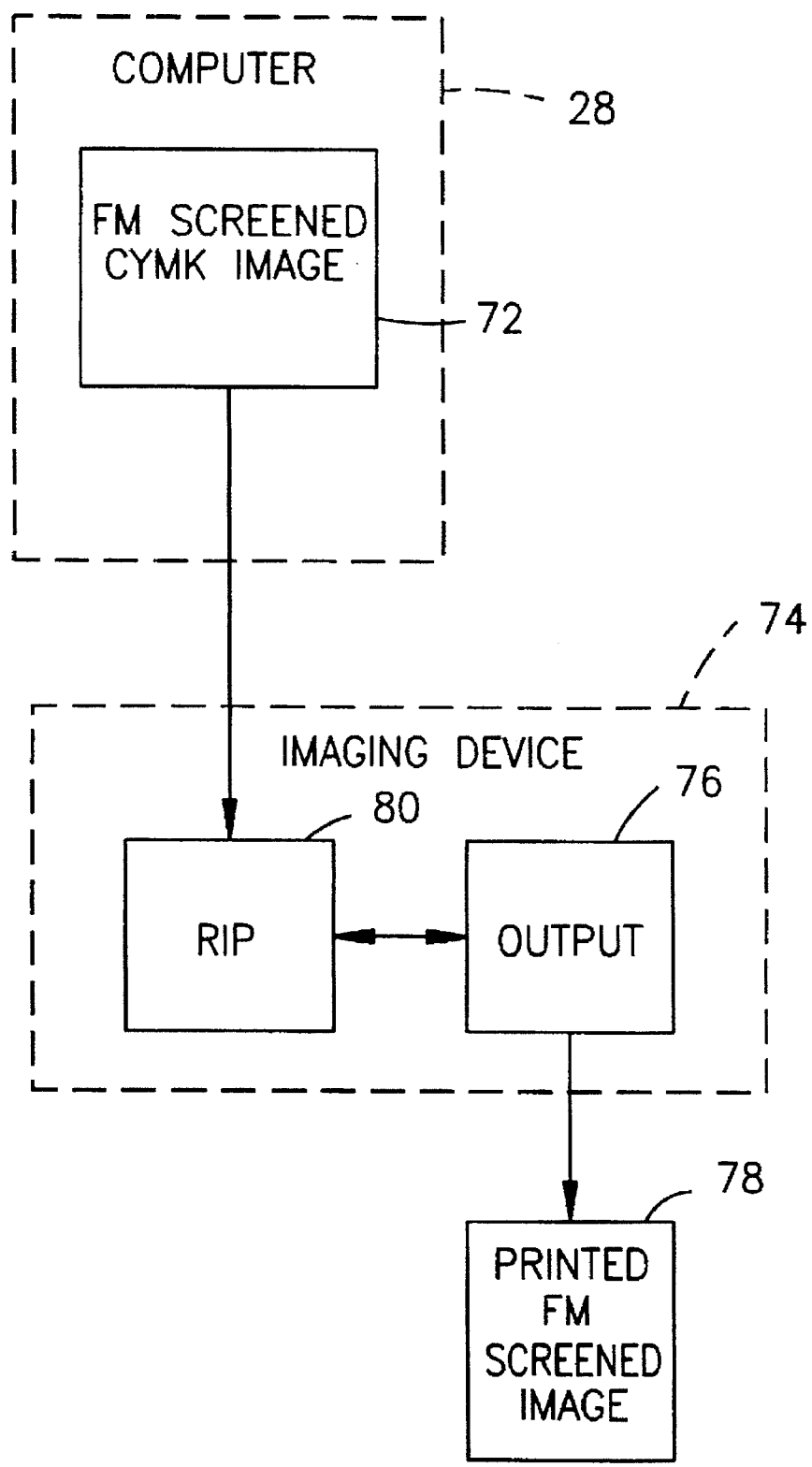
FIG. 3 is a block diagram illustrating how an FM screened digital image of the present invention is directed to an imaging device and thereafter printed.

Referring to FIG. 3, the CMYK FM screened digital image 72 is directed to an imaging device 74 which further directs the image through an output 76 to produce a printed FM screened image 78 on a printable material. The imaging device 74 used in the method of the present invention does not need any FM screening software loaded in the RIP 80, as in the prior art, since the image arriving at the imaging device 74 already has the random dot pattern, FM screening, applied. The method of the present invention does not require that the FM screening be applied to the entire image. Any portion of the image can have the FM screening applied.

Figure 4:
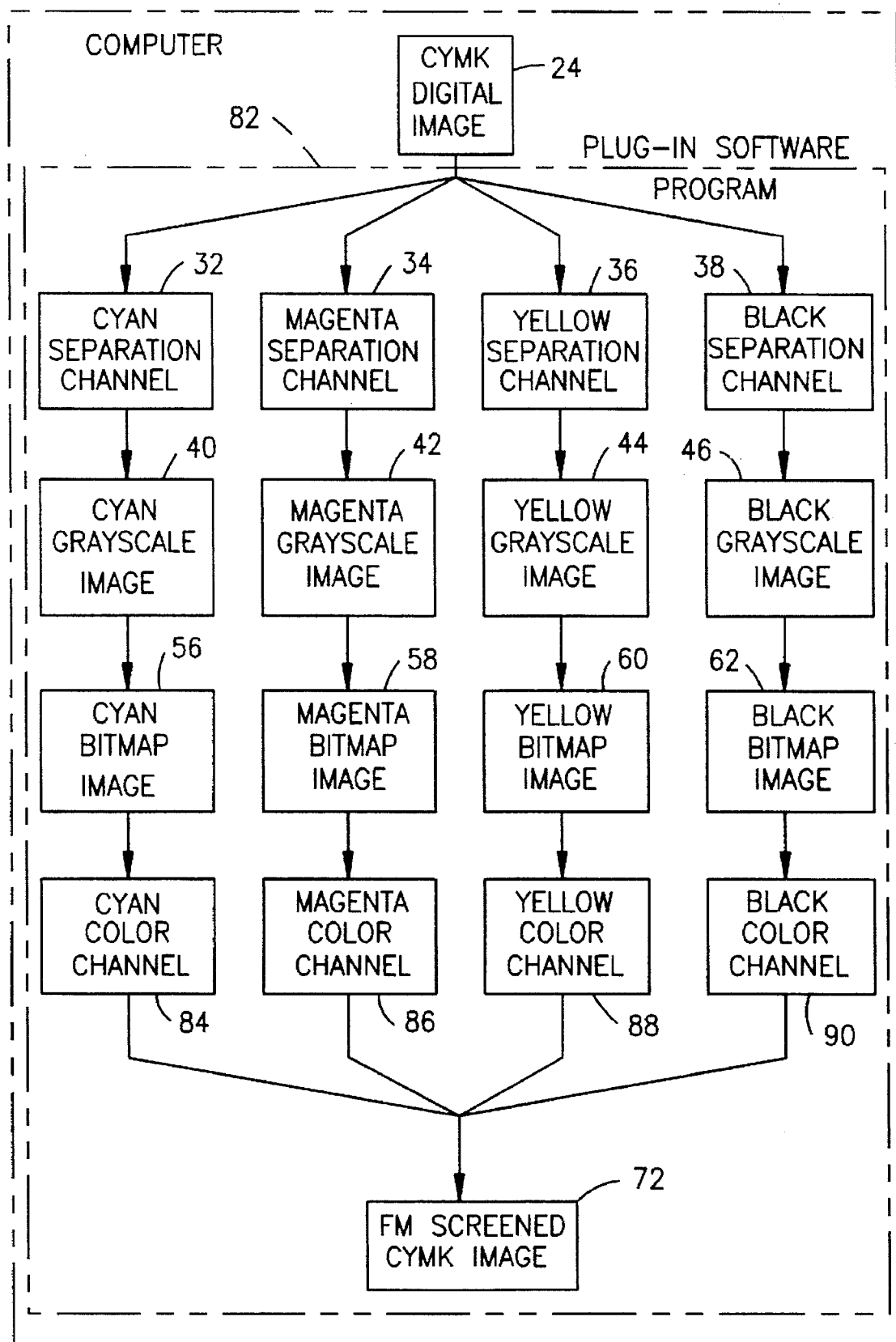
FIG. 4 is a block diagram illustrating the steps performed in the method for applying FM screening of the present invention, a portion of the steps of the method being performed by a plug-in software program.

Referring to FIG. 4, the alternate method of the present invention is depicted illustrating how a portion of the steps of the method can be performed by a plug-in software program. The steps that are performed by the plug-in software program 82 are enclosed within dashed lines. The preferred software program 82 is a plug-in program loaded into any of the wide selection of pixel or postscript based image editing software programs.

The method of the present invention utilizes a storage medium 30 compatible with a computer system. Examples of storage mediums include a computer hard disk, a computer floppy disk, an optical disk, tape, or any other storage medium compatible with a computer system. Further, the imaging device 74 used in the method of the present invention includes a wide variety of outputed formats. Examples of the outputed formats include resin-coated paper, tree pulp based papers, vinyl, plastic, wax-coated substrates, metal substrates, press plates, press drums, or any imaging device using digital or electrical methods to transfer file information into a format suitable or designed for duplication, heat transfer, or waterless, web, screen, ink jet, continuous tone, gravure, flexo-graphic, offset and lithographic printing. Yet further, the method of the present invention may be used with a wide variety of computer graphic formats. Examples of computer graphic formats that can be used with the method include TIFF, EPS, TARGA, and, PICT. The preceding examples are merely listed herein as possible examples of storage mediums, printable materials, and. computer graphic formats that work with the present invention, and are not meant to limit other possible mediums, materials, and formats, respectively, in the method of the present invention.

Equivalent steps can be substituted for the steps employed in this invention to obtain the same results in the same way.

Having thus described the invention what is claimed and desired to be secured by Letters Patent is:

1. A method for applying FM screening to a digital image in a computer, the steps comprising, (a) providing a single composite CMYK digital image in random access memory of the computer from the digital image in the computer, (b) providing a means for separating the CMYK digital image to produce four color separation channels selected from the group consisting of a cyan separation channel, a magenta separation channel, a yellow separation channel, and a black separation channel, (c) providing a means for converting the four color separation channels to produce four corresponding grayscale images, selected from the group consisting of a cyan grayscale image, a magenta grayscale image, a yellow grayscale image, and a black grayscale image, the four grayscale images represented by conventional half-tone dots, (d) providing a means for converting the four grayscale images to produce four corresponding FM screened bit-map images by applying FM screening to the four grayscale images, the four FM screened bit-map images selected from the group consisting of a cyan FM screened bit-map image, a magenta FM screened bit-map image, a yellow FM screened bit-map image, and a black FM screened bit-map image, the four FM screened bit-map images represented by black FM dots, (e) providing a means for adding respective color to the FM screened bit-map images to produce four corresponding colorized FM screened bit-map images, selected from the group consisting of a cyan colorized FM screened bit-map image, a magenta colorized FM screened bit-map image, a yellow colorized FM screened bit-map image, and a black colorized FM screened bit-map image, the four colorized FM screened bit-map images represented by colorized FM dots, (f) providing a means for combining the four colorized FM screened bit-map images to produce a single composite CMYK FM screened digital image while retaining the four separate colorized FM screened bit-map images within the single composite CMYK FM screened digital image, the composite CMYK FM screened digital image providing a means for pre-imaging digital image manipulation, and (g) directing the CMYKFM screened digital image to an imaging device for outputing on a printable material.

2. The method for applying FM screening to a digital image in a computer according to claim 1, wherein the means for adding respective color to the FM screened bit-map images to produce four corresponding colorized FM screened bit-map images is four color channels, selected from the group consisting of a cyan color channel, a magenta color channel, a yellow color channel, and a black color channel.

3. The method for applying FM screening to a digital image in a computer according to claim 1, wherein the cyan colorated FM screened bit-map image is represented by cyan FM dots, the magenta colorized FM screened bit-map image is represented by magenta dots, the yellow colorized FM screened bit-map image is represented by yellow FM dots, and the black colorized FM screened bit-map image is represented by black FM dots.

4. The method for applying FM screening to a digital image in a computer according to claim 3, wherein a positioning of the colorized FM dots in each colorized FM screened bit-map image represents a coverage value of each color relative to the amount of color in the four color separation channels respectively.

5. The method for applying FM screening to a digital image in a computer according to claim 3, wherein the position of the colorized FM dots in each colorized FM screened bit-map images is movable.

6. The method for applying FM screening to a digital image in a computer according to claim 1, wherein the means for pre-imaging digital image manipulation permits image editing of each of the four colorized FM screened bit-map images while viewing the composite CMYK FM screened digital image as a single composite CMYK image.

7. A method for applying FM screening to a digital image in a computer, the steps comprising, (a) providing a single composite CMYK digital image in random access memory of the computer from the digital image in the computer, (b) separating the CMYK digital image into four color separation channels selected from the group consisting of, a cyan separation channel, a magenta separation channel, a yellow separation channel, and a black separation channel, (c) converting the four color separation channels into four corresponding grayscale images, selected from the group consisting of a cyan grayscale image, a magenta grayscale image, a yellow grayscale image, and a black grayscale image, the four grayscale images represented by conventional half-tone dots, a positioning of the half-tone dots in each grayscale image representing a coverage value relative to the amount of color in each of the four color separation channels, (d) converting the four grayscale images into four corresponding FM screened bit-map images by applying FM screening to the four grayscale images, the four FM screened bit-map images, selected from the group consisting of a cyan FM screened bit-map image, a magenta FM screened bit-map image, a yellow FM screened bit-map image, and a black FM screened bit-map image, the four FM screened bit-map images represented by black FM dots, a positioning of the black FM dots in each FM screened bit-map representing a coverage value relative to the amount of color in the four color separation channels, (e) converting the four FM screened bit-map images into four corresponding colorized FM screened bit-map images by applying a respective color channel to the four FM screened bit-map images, the four colorized FM screened bit-map images represented by colorized FM dots, a positioning of the colorized FM dots in each colorized FM screened bit-map image representing a coverage value relative to the amount of color in the four color separation channels respectively, (f) combining the four colorized FM screened bit-map images to produce a single composite CMYK FM screened digital image while retaining the four separate colorized FM screened bit-map images within the single composite CMYK FM screened digital image, the CMYK FM screened digital image providing a means for pre-imaging digital image manipulation, and (g) directing the CMYK FM screened digital image to an imaging device for outputing on a printable material.

8. The method for applying FM screening to a digital image in a computer according to claim 7, wherein the means for pre-imaging digital image manipulation permits image editing of each of the four colorized FM screened bit-map images while viewing the composite CMYK FM screened digital image as a single composite CMYK image.

9. The method for applying FM screening to a digital image in a computer according to claim 7, wherein the cyan colorized FM screened bit-map image is represented by cyan FM dots, the magenta colorized FM screened bit-map image is represented by magenta FM dots, the yellow colorized FM screened bit-map image is represented by yellow FM dots, and the black colorized FM screened bit-map image is represented by black FM dots.

10. The method for applying FM screening to a digital image in a computer according to claim 7, wherein a positioning of the colorized FM dots in each colorized FM screened bit-map image represents a coverage value of each color relative to the amount of color in the four color separation channels respectively.

11. A method for applying FM screening to a digital image in a computer, the steps comprising, (a) providing a single composite CMYK digital image in random access memory of the computer from the digital image in the computer, (b) retaining the CMYK digital image in a single composite CMYK digital file in a storage medium, (c) separating the CMYK digital image into four color separation channels, selected from the group consisting of a cyan separation channel, a magenta separation channel, a yellow separation channel, and a black separation channel, (d) converting the four color separation channels into four corresponding grayscale images, selected from the group consisting of a cyan grayscale image, a magenta grayscale image, a yellow grayscale image, and a black grayscale image, the four grayscale images represented by conventional half-tone dots, a positioning of the half-tone dots in each grayscale image representing a coverage value relative to the amount of color in each of the four color separation channels respectively, (e) retaining the four grayscale images in four corresponding grayscale files in the storage medium, selected from the group consisting of a cyan grayscale file, a magenta grayscale file, a yellow grayscale file, and a black grayscale, file, (f) converting the four grayscale images into four corresponding FM screened bit-map images by applying FM screening to the four grayscale images, the four FM screened bit-map images, selected from the group consisting of a cyan FM screened bit-map image, a magenta FM screened bit-map image, a yellow FM screened bit-map image, and a black FM screened bit-map image, the four FM screened bit-map images represented by black FM dots, a positioning of the black FM dots in each FM screened bit-map representing a coverage value relative to the amount of color in the four color separation channels respectively, (g) retaining the four FM screened bit-map images in four corresponding FM screened bit-map files in the storage medium, selected from the group consisting of a cyan FM screened bit-map file, a magenta FM screened bit-map file, a yellow FM screened bit-map file, and a black FM screened bit-map file, (h) converting the four FM screened bit-map images into four corresponding colorized FM screened bit-map images by applying a color channel to the four FM screened bit-map images, the four colorized FM screened bit-map images represented by colorized FM dots respectively, a positioning of the colorized FM dots in each colorized FM screened bit-map image representing a coverage value relative to the amount of color in the four color separation channels respectively, (i) combining the four colorized FM screened bit-map images to produce a single composite CMYK FM screened digital image while retaining the four separate colorized FM screened bit-map images within the single composite CMYK FM screened digital image, the CMYK FM screened digital image providing a means for pre-imaging digital image manipulation, (j) retaining the single composite CMYK FM screened digital image in a single composite CMYK FM screened digital file in the storage medium, and (k) directing the CMYK FM screened digital image to an imaging device for outputting on a printable material.

12. The method for applying FM screening to a digital image in a computer according to claim 11, wherein the means for pre-imaging digital image manipulation permits image editing of each of the four colorized FM screened bit-map images while viewing the composite CMYK FM screened digital image as a single composite CMYK image.

* * * * *